Jan. 29, 1924.
F. MYERS
1,482,315
PNEUMATIC TIRE VALVE
Filed Aug. 14, 1922
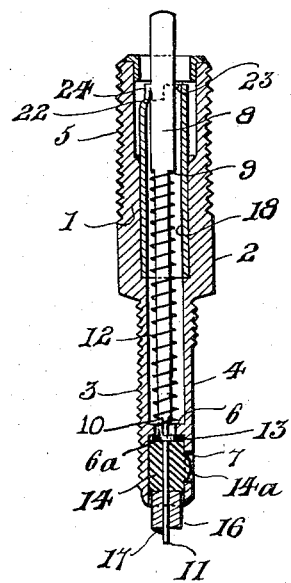
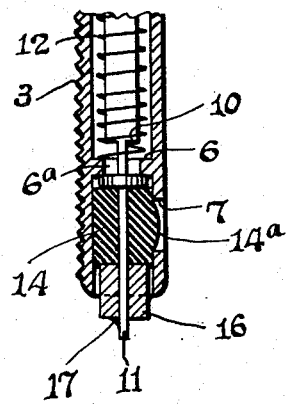
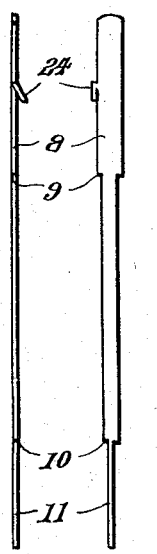
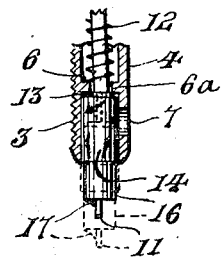
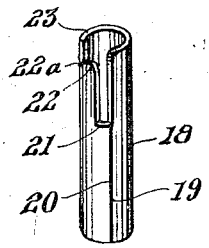
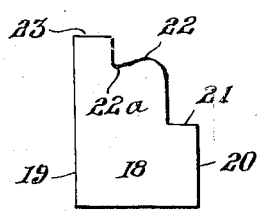
Inventor
Frederick Myers Patented Jan. 29, 1924.

1,482,315

UNITED STATES PATENT OFFICE.

FREDERICK MYERS, OF NEW YORK, N. Y.

PNEUMATIC-TIRE VALVE.

Application filed August 14, 1922. Serial No. 581,704.

*To all whom it may concern:*

Be it known that I, FREDERICK MYERS, a citizen of the United States of America, residing at New York, in the county of New York and State of New York, have invented certain new and useful Improvements in Pneumatic-Tire Valves, of which the following is a specification.

This invention relates to certain new and useful improvements in valves, and has particular reference to that type of valve associated with the pneumatic inner tube of an automobile or other tire, wherein the valve is automatically closed when an air pump is disengaged therefrom.

The primary object of the invention resides in the provision of a tensioned closure valve for the stem casing of an inner tube for pneumatic tires, said valve automatically closing and having means associated with the outer end thereof for holding the valve to its seat and in a locked position.

The locking device for retaining the valve in a closed position upon its seat at the lower end of the tubular casing supporting the same embodies a relatively small sleeve disposed within the tubular casing and through which the valve stem is slidable, said sleeve having a slot formed in one side thereof through which a laterally projecting finger carried by the valve stem is freely movable, the valve stem being partially rotated by gripping the outer end thereof to position the stem finger upon a shoulder formed at the upper end of the sleeve to hold the stem against sliding movement with the valve locked to its seat.

A still further object of the invention has reference to that type of tire valve wherein a resiliently mounted valve stem projects through the lower end of the casing with a cushion valve retained upon the lower end of the stem and extending upwardly into the casing for association with a lateral air port provided in the casing adjacent the lower end.

The invention further embodies a tire valve having a resiliently mounted valve stem with a cushion valve carried by the lower end of the stem and extending upwardly into the casing for association with a lateral air port within the casing and having means associated with the valve stem and casing for compressing the cushion valve within the casing to expand the cushion valve into the lateral air port for effectively sealing the same and locking the valve in a closed position.

This application is a continuation in part, in so far as shown and described in application filed by me on May 11th, 1922, Serial No. 560,082, and embodies improvements thereover as herein set forth.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawing forming a part of this application and in which like designating characters refer to corresponding parts throughout the several views:

Figure 1 is a vertical sectional view of a tire valve constructed in accordance with the present invention showing the valve in its closed and locked position, and the cooperating locking means for the valve carried by the valve stem and tubular casing supporting the same.

Figure 2 is a vertical sectional view showing the valve in its closed unlocked position, and showing by dotted lines the valve stem depressed and the valve spaced from its seat in an open position, Fig. 2ª is a vertical sectional view similar to Fig. 2 showing the valve in its closed position.

Figure 3 shows side and edge elevational views of the valve stem,

Figure 4 is a perspective view of the locking sleeve carried by the tubular casing for cooperation with the valve stem, Figures 5, 6 and 7 show perspective views, respectively, of the stop washer, cushion valve, and valve retaining collar detached from the valve stem, and Figure 8 is a developed plan view of the locking sleeve associated with the valve stem.

Referring more in detail to the accompanying drawing, it being understood that the device illustrated therein embodies a valve mechanism for the casing stem of a pneumatic inner tube for tires, there is illustrated a tubular member 1 adapted for association with the casing stem of a pneumatic tire, the tubular member 1 being provided with a wrench engaging surface 2 intermediate the upper and lower ends thereof, the lower or inner end being reduced and externally threaded as at 3 with a side face thereof flattened or unprovided with threads as at 4, while the upper or outer end of the tubular member is externally threaded as at 5 for the reception of a closure cap in the usual manner. The bore of the tubular member 1 adjacent the inner reduced end thereof is provided with an annular flange 6 for purposes presently to appear, while the flattened or unthreaded portion 4 of the inner end of the tubular member is provided with an air port 7.

The valve mechanism associated with the tubular member 1 embodies a valve stem 8 successively reduced and shouldered as at 9 and 10, the valve stem being rectangular in cross section with the inner end 11 thereof formed circular as shown in Figs. 1 and 3. A coil spring 12 incloses the valve stem 8, the upper end of the coil spring engaging the stem shoulder 9 while the lower end of said coil spring engages the internal flange 6 carried by the inner reduced end of the tubular member with the inner end and shouldered portion 10 of the valve stem extending through the opening 6ª afforded by the flange 6 to effect the resilient mounting of the valve stem.

A cushion valve is associated with the inner end 11 of the valve stem, an apertured washer 13 being placed upon the end 11 of the valve stem for engagement with the shoulder 10, the cushion valve 14 being in the form of a cylinder and having an axial bore 15 is received on the end 11 of the valve stem engaging the washer 13 adjacent the stem shoulder 10. To retain the cushion valve 14 upon the inner end of the valve stem, a split nut or collar 16 frictionally received upon the terminal end 11 of the valve stem and permanently secured thereto, such as by soldering or otherwise, as indicated by the reference numeral 17 in Figs. 1 and 2. The lower end of the coil spring 12 engaging the flange 6 carried by the tubular member 1 and having the upper end thereof engaging the shoulder 9 upon the valve stem, will normally tend to elevate the valve stem 8 to the full line position shown in Fig. 2 with the cushion valve 14 received in the lower reduced end of the tubular member and spanning the lateral port 7 to close the same and prevent the escape of air from the tube therethrough.

A locking device is associated with the valve stem 8 and cushion valve 14, the upper end of the tubular member 1 being bored to receive a locking sleeve 18 shown in detail in Figs. 4 and 8 as being formed from a blank substantially rectangular in plan view embodying one perpendicular edge 19 and an opposite relatively short perpendicular edge 20, the latter edge being cut away to provide a shoulder 21, an upper ledge 22 having an end depression 22ª and an upper edge 23. When the blank 18 is folded into sleeve formation as shown in Fig. 4, the opposite side edges 19 and 20 are brought into engagement with each other defining a side slot adjacent the upper end of the sleeve caused by the shoulder 21 while the ledge 22 is spaced below the upper edge 23 of the sleeve. The sleeve 18 is positioned in the upper end of the tubular member 1 as indicated in Fig. 1, the upper end of the valve stem 8 carrying a canted edge lug 24 that cooperates with said locking sleeve.

From the above detail description of the device, it is believed that the construction and operation thereof will at once be apparent, it being noted that when the cushion valve 14 is in its closed and unlocked position as illustrated by full lines in Fig. 2, said valve closes the lateral port 7 in the inner end of the tubular member 1 to prevent the escape of air from the tube therethrough. In inflating a tire, an air delivery hose or pressure device being attached to the outer end of the tubular member 1 will unseat the valve 14 by air pressure passing through the tubular member and contacting the head of the valve and the washer 13 associated therewith to shift the valve to the dotted line position shown in Fig. 2 for uncovering the lateral port 7. When the air pump is released from the outer end of the tubular member 1, the spring 12 will function to restore the valve 14 to its closed position for spanning the port 7, and when it is desired to lock the cushion valve in a closed position relative to said air port, the upper end of the valve stem 8 is gripped by hand or a suitable implement, and partially rotated to cause the canted lug 24 carried by one edge thereof to ride over the ledge 22 of the lock sleeve 18, continued rotation of the valve stem positioning the lug 24 for reception in the recess or depression 22ª of said ledge. During this operation, the valve stem 8 has been moved upwardly through the tubular member 1 with the washer 13 being engaged with the flange 6 of said tubular member, the cushion valve 14 being compressed between the split collar 16 and flange 6 to be laterally expanded or bulged as at 14ª through the lateral air port 7, substantially filling said port as illustrated in Fig. 1 to effectively seal the same against the passage of air therethrough. The valve 14 is retained in a compressed and locked condition by the canted lug 24 resting in the depression 22ª of the ledge 22 in the locking sleeve and accidental shifting of the valve stem 8 to release the cushion valve 14 is entirely eliminated. When the valve stem is partially rotated to aline the canted lug 24 with the slot adjacent the upper end of the locking sleeve, compression on the cushion valve 14 is relieved and the same then assumes the full lines position shown in Fig. 2, closing the lateral air port 7 and being in position for sliding movement partially outwardly of the tubular member 1 upon inflation of the tire or the passage of air through said tubular member.

While there is herein shown and described the preferred embodiment of the present invention it is nevertheless to be understood that minor changes may be made therein without departing from the spirit and scope of the invention as claimed.

What I claim as new is:—

1. In a pneumatic tire valve, a tubular member adapted for mounting in a casing stem, said tubular member having a lateral air port therein adjacent the inner end, a valve stem resiliently mounted in the tubular member, and a cushion valve carried by the inner end of the valve stem associated with the lateral air port.

2. In a pneumatic tire valve, a tubular member adapted for mounting in a casing stem, said tubular member having a lateral air port therein adjacent the inner end, a valve stem resiliently mounted in the tubular member, and a cushion valve carried by the inner end of the valve stem, extending into the tubular member and associated with the lateral air port.

3. In a pneumatic tire valve, a tubular member adapted for mounting in a casing stem, said tubular member having a lateral air port therein adjacent the inner end, a valve stem resiliently mounted in the tubular member, a cushion valve carried by the inner end of the valve stem associated with the lateral air port, and means permanently secured to the inner terminal end of the valve stem for confining the cushion valve on the stem.

4. In a pneumatic tire valve, a tubular member adapted for mounting in a casing stem, said tubular member having a lateral air port therein adjacent the inner end, a valve stem resiliently mounted in the tubular member, a cushion valve carried by the inner end of the valve stem extending into the tubular member and associated with the lateral air port, and means permanently secured to the inner terminal end of the valve stem for confining the cushion valve on the stem.

5. In a pneumatic tire valve, a tubular member adapted for mounting in a casing stem, said tubular member having a lateral air port therein adjacent the inner end, a valve stem resiliently mounted in the tubular member, a cushion valve carried by the inner end of the valve stem associated with the lateral air port, means permanently secured to the inner terminal end of the valve stem for confining the cushion valve on the stem, and cooperating means carried by the tubular member and valve stem for compressing the valve at the upper end thereof for moving or expanding a portion thereof into the lateral air port.

6. In a pneumatic tire valve, a tubular member adapted for mounting in a casing stem, said tubular member having a lateral air port therein adjacent the inner end, a valve stem resiliently mounted in the tubular member, a cushion valve carried by the inner end of the valve stem extending into the tubular member and associated with the lateral air port, means permanently secured to the inner terminal end of the valve stem for confining the cushion valve on the stem, and cooperating means carried by the tubular member and valve stem for compressing the valve at the upper end thereof for moving or expanding a portion thereof into the lateral air port.

7. In a pneumatic tire valve, a tubular member adapted for mounting in a casing stem, said tubular member having a lateral air port therein adjacent the inner end, a valve stem resiliently mounted in the tubular member, a cushion valve carried by the inner end of the valve stem associated with the lateral air port, means permanently secured to the inner terminal end of the valve stem for confining the cushion valve on the stem, and cooperating means carried by the tubular member and valve stem for compressing the valve at the upper end thereof for moving or expanding a portion thereof into the lateral air port, said cooperating means being further operative for retaining the valve compressed and in a locked position.

8. In a pneumatic tire valve, a tubular member adapted for mounting in a casing stem, said tubular member having a lateral air port therein adjacent the inner end, a valve stem resiliently mounted in the tubular member, a cushion valve carried by the inner end of the valve stem extending into the tubular member and associated with the lateral air port, means permanently secured to the inner terminal end of the valve stem for confining the cushion valve on the stem, and cooperating means carried by the tubular member and valve stem for compressing the valve at the upper end thereof for moving or expanding a portion thereof into the lateral air port, said cooperating means being further operative for retaining the valve compressed and in a locked position.

9. In a pneumatic tire valve, a tubular member adapted for mounting in a casing stem, an internal flange carried by the tubular member adjacent the inner end, a valve stem having spaced shoulders slidably mounted in the tubular member and extending through the center of the flange, a coil spring surrounding the valve stem engaging the upper stem shoulder and said flange for resiliently mounting the valve stem, a cushion valve upon the inner end of the valve stem beneath said flange, means for permanently retaining the valve on said stem, and said tubular member having a lateral air port therein adjacent the inner end normally closed by the cushion valve.

10. In a pneumatic tire valve, a tubular member adapted for mounting in a casing stem, an internal flange carried by the tubular member adjacent the inner end, a valve stem having spaced shoulders slidably mounted in the tubular member and extending through the center of the flange, a coil spring surrounding the valve stem engaging the upper stem shoulder and said flange for resiliently mounting the valve stem, a cushion valve upon the inner end of the valve stem beneath said flange, means for permanently retaining the valve on said stem, said tubular member having a lateral air port therein adjacent the inner end normally closed by the cushion valve, and cooperative means carried by the tubular member and valve stem adapted upon rotation of the valve stem to elevate same and compress the cushion valve between the flange and retaining means therefor to expand the valve into the lateral air port for sealing the same.

11. In a pneumatic tire valve, a tubular member adapted for mounting in a casing stem, an internal flange carried by the tubular member adjacent the inner end, a valve stem having spaced shoulders slidably mounted in the tubular member and extending through the center of the flange, a coil spring surrounding the valve stem engaging the upper stem shoulder and said flange for resiliently mounting the valve stem, a cushion valve upon the inner end of the valve stem beneath said flange, means for permanently retaining the valve on said stem, said tubular member having a lateral air port therein adjacent the inner end normally closed by the cushion valve, a locking sleeve secured in the outer end of the tubular member and having a side slot and upper cutaway ledge opening into the slot and a canted lug carried by the valve stem adapted to ride over the ledge upon rotation of the valve stem to compress the cushion valve and expand same into the lateral air port.

12. In a pneumatic tire valve, a tubular member adapted for mounting in a casing stem, an internal flange carried by the tubular member adjacent the inner end, a valve stem having spaced shoulders slidably mounted in the tubular member and extending through the center of the flange, a coil spring surrounding the valve stem engaging the upper stem shoulder and said flange for resiliently mounting the valve stem, a cushion valve upon the inner end of the valve stem beneath said flange, means for permanently retaining the valve on said stem, said tubular member having a lateral air port therein adjacent the inner end normally closed by the cushion valve, a locking sleeve secured in the outer end of the tubular member and having a side slot and upper cutaway ledge opening into the slot, a canted lug carried by the valve stem adapted to ride over the ledge upon rotation of the valve stem to compress the cushion valve and expand same into the lateral air port, and said ledge having a recess adjacent the end thereof to receive said stem lug to prevent accidental rotation of the valve stem.

In testimony whereof I affix my signature.

FREDERICK MYERS.